United States Patent [19]
Häb-Umbach et al.

[11] Patent Number: 5,873,061
[45] Date of Patent: Feb. 16, 1999

[54] METHOD FOR CONSTRUCTING A MODEL OF A NEW WORD FOR ADDITION TO A WORD MODEL DATABASE OF A SPEECH RECOGNITION SYSTEM

[75] Inventors: Reinhold Häb-Umbach; Peter Beyerlein; Eric Thelen, all of Aachen, Germany

[73] Assignee: U.S. Philips Corporation, New York, N.Y.

[21] Appl. No.: 642,018

[22] Filed: May 2, 1996

[30] Foreign Application Priority Data

May 3, 1995 [EP] European Pat. Off. .............. 95201139

[51] Int. Cl.$^6$ ....................................................... G10L 5/06
[52] U.S. Cl. ............................ 704/254; 704/251; 704/252
[58] Field of Search ..................... 395/2.6, 2.63, 395/2.64, 2.65, 2.4

[56] References Cited

U.S. PATENT DOCUMENTS

| | | | |
|---|---|---|---|
| 4,819,271 | 4/1989 | Bahl et al. | 381/43 |
| 5,129,001 | 7/1992 | Bahl et al. | 381/43 |
| 5,165,007 | 11/1992 | Bahl et al. | 395/2 |
| 5,170,432 | 12/1992 | Hackbarth et al. | 381/43 |
| 5,315,689 | 5/1994 | Kanazawa et al. | 395/2.47 |
| 5,390,278 | 2/1995 | Gupta et al. | 395/2.52 |
| 5,429,513 | 7/1995 | Diaz-Plaza | 434/167 |
| 5,454,062 | 9/1995 | La Rue | 395/2.63 |
| 5,502,774 | 3/1996 | Bellegarda et al. | 382/159 |
| 5,502,791 | 3/1996 | Nishimura et al. | 395/2.65 |
| 5,528,728 | 6/1996 | Matsuura et al. | 704/232 |
| 5,613,034 | 3/1997 | Ney et al. | 395/2.6 |
| 5,621,859 | 4/1997 | Schwartz et al. | 395/2.65 |
| 5,638,487 | 6/1997 | Chigier | 395/2.62 |

FOREIGN PATENT DOCUMENTS 0344017  11/1989  European Pat. Off. .............. 395/2.47

OTHER PUBLICATIONS

"A Method for the Construction of Acoustic Markov Models for Words", IEEE Transactions on Speech and Audio Processing, vol. 1, No. 4, Oct. 1993 by L.R. Bahl et al.

"Automatic Recognition of Keywords in Unconstrained Speech Using Hidden Markov Models" IEEE Transactions on Acoustics, Speech, and Signals, Processing, vol. 38, No. 11 Nov. 1990, by Jay G. Wilpon et al.

*Primary Examiner*—David R. Hudspeth
*Assistant Examiner*—Michael N. Opsasnick

[57] ABSTRACT

For speech recognition a new word is represented as based on a stored inventory of models of sub-word units. First a plurality of utterances are presented that all should conform to the word. For building a word model from the utterances, these are represented by a sequence of feature vectors. First, the utterances are used to train a whole-word model that is independent of the models of the sub-word units. The length of the whole-word model equals the average length of the utterances. Next, a sequence of Markov states and associated probability densities of acoustic events of the whole-word model is interpreted as a reference template represented by a string of averaged feature vectors. Finally, the string is recognized by matching to models in the inventory and storing a recognition result as a model of the utterances.

4 Claims, 3 Drawing Sheets

METHOD FOR CONSTRUCTING A MODEL OF A NEW WORD FOR ADDITION TO A WORD MODEL DATABASE OF A SPEECH RECOGNITION SYSTEM

The invention relates to a method for representing a new word for speech recognition as based on a stored inventory of models of sub-word units. The method includes: presenting a plurality of utterances that all intendedly conform to the new word, representing the utterances by a sequence of feature vectors and building a word model from the utterances.

BACKGROUND OF THE INVENTION

In the environment of the invention, a word is understood to mean any linguistic entity of more or less restricted length, and thus may include brief sentences, personal and other names, and other items that warrant machine recognition upon their being presented in the form of speech. In particular, the invention addresses the problem of finding an acoustic representation, hereinafter also called transcription, of an unknown word as a sequence of sub-word units. This is effected through providing only a few sample utterances of the unknown word(s), and furthermore, an inventory of speaker-independent sub-word unit models.

A problem arises if a user wants to add one or more additional vocabulary words to a speaker-independent recognition system, by training the system with only a few utterances of the new word. Speaker-independent recognition is used when the number of envisaged speakers to use a particular type of system is relatively large and/or the system is relatively inexpensive. A typical example would be a speech actuated telephone device that normally may recognize the ten digits and a few standard terms, and which the user may train to recognize in addition such names or other labels that pertain to frequently called telephone extensions.

Another example would be useful with a speaker-independent speech recognition system that could have only a limited standard set of recognizable words, such as only twenty. This system then should have been trained on many different speakers. The system may now have to be extended with extra words, for which only a very limited number of training speakers, such as no more than three, is available, but for which extra words the same recognition robustness is required as for the original set.

Still another example would be with a grapheme-to-phoneme conversion, wherein a new word from keyboard entry is transcribed into an acoustic model. To improve reliability, the keyboard entry is then supplemented by acoustic entry of the same word. The parallel presentations again improve robustness, and under particular circumstances would also solve reliability problems due to orthographic errors, or due to the existence of two correct pronunciations of a single written word which then would have respective different meanings.

In particular, it is a requirement that the minimally necessary number of training utterances should remain low, such as no more than three, for nevertheless attaining a reliable performance at later recognizing. The problem also is generally restricted to systems that allow adding only a limited set of words, say, up to ten words. If the number of words added becomes too high, the transcription could render confusable results. On the other hand, the set of standard words may be either small or large.

SUMMARY TO THE INVENTION

In consequence, amongst other things, it is an object of the present invention to provide a method according to the preamble, wherein deviations between the various training utterances are rendered harmless, in that they would not lead to training the system on a spuriously misshaped utterance by the user person. In consequence, according to one of its aspects, the invention is characterized by first, training a whole-word model that is independent of the models of the sub-word units, using said utterances, said whole-word model having a length corresponding to the average length of the utterances, second, interpreting a first sequence of Markov states and associated probability densities of acoustic events of the whole-word model as a reference template represented by a second sequence of averaged feature vectors, and third, recognizing said second sequence by matching to models of sub-word units in said inventory and storing a recognition result as a model of said utterances.

In contradistinction, a publication by L. R. Bahl et al, A Method for the Construction of Acoustic Markov Models for Words, IEEE Trans. on Speech and Audio Processing Vol I, No. 4, Oct. 1993, pp. 443–452 describes another method for producing a transcription on the basis of a plurality of utterances. According to the reference, each utterance results in its own transcription. Subsequently, all respective transcriptions are mapped onto all utterances, to find the optimum transcription, which also implies the best utterance. The present inventors have found that such procedure requires an excessive amount of processing when all acoustic distortions, time warpings, scale variations, and other non-conformance among the utterances is taken into account. In particular, when considering the envisaged use of the invention in a device of limited capability, such as for example, but not limited to, a handheld telephone, this would tie up the device for a long interval, during which it is unavailable for other functions. In fact, the known procedure needs a processing time that is proportional to the square of the number of utterances, whereas the present invention needs only a processing time that is linear in the number of utterances.

Other relevant references are EP-B1-285 222, corresponding to U.S. Pat. No. 5,058,166, on modelling, and EP-A3-533 260, corresponding to U.S. patent application Ser. No. 07/944,554 (PHD 91.138) on the execution of a tree search operation in speech recognition, all being assigned to the assignee of the present application, and all being incorporated by reference.

Furthermore, an advantageous embodiment of the present invention combines with the teachings of Bahl et al, in that the transcription based on the average utterance as attained in the present invention, would in a subsequent operation, compete with the various one-utterance transcriptions produced according to the method of Bahl et al. Under certain circumstances this brings about further improvement to the result acquired according to the foregoing.

The invention also relates to an device for implementing the method. Further advantageous aspects are recited in dependent claims.

BRIEF DESCRIPTION OF THE DRAWINGS

These and other aspects and advantages of the invention will be described in detail hereinafter with reference to preferred embodiments, and in particular with reference to the appended Figures, that show.

DESCRIPTION OF THE PREFERRED EMBODIMENTS

First, a brief formulation of the inventive method is given. The start of the procedure is the providing of a stored inventory of models of sub-word units. Now, in the method, a separate whole-word model with single-density emission probabilities is derived from the n given utterances, wherein n may be an appropriate number, such as three or five. This model can be interpreted as an 'average utterance' $\overline{Y}$ obtained from the various utterances, where the observation vectors of this average utterance are the mean vectors of the state-specific emission probability densities. The transcription of the unknown word is given by the subword unit sequence which had most likely produced this average utterance $\overline{Y}$:

$$T_{avg} = \mathrm{argmax}_{s \in S} P(\overline{Y}|s)$$

This subword unit sequence can in its turn be found by a continuous-speech recognition procedure. In particular, the selected transcription $T_{avg}$ can be any one out of the set S of sub-word unit sequences.

In a somewhat broader aspect, the invention first uses the various utterances to train a whole-word model which is independent of the models of the sub-word units and has a length that is equal to the average length of the utterances. Next, the whole-word model is used to therefrom derive a sequence of Markov states and associated probability densities of acoustic events. By itself, such representation as a hidden Markov process has been in wide use in speech recognition technology. This representing also leads to the distinguishing of sub-word units in the utterance, so that the result of the interpretation can be used as a template consisting of a sequence of averaged feature vectors. In their turn, elements of this latter sequence can be matched to models of the sub-word units in the inventory, so that the recognition string is in fact a model of the averaged utterances, and can subsequently be used to recognize further utterances.

Figure 1:
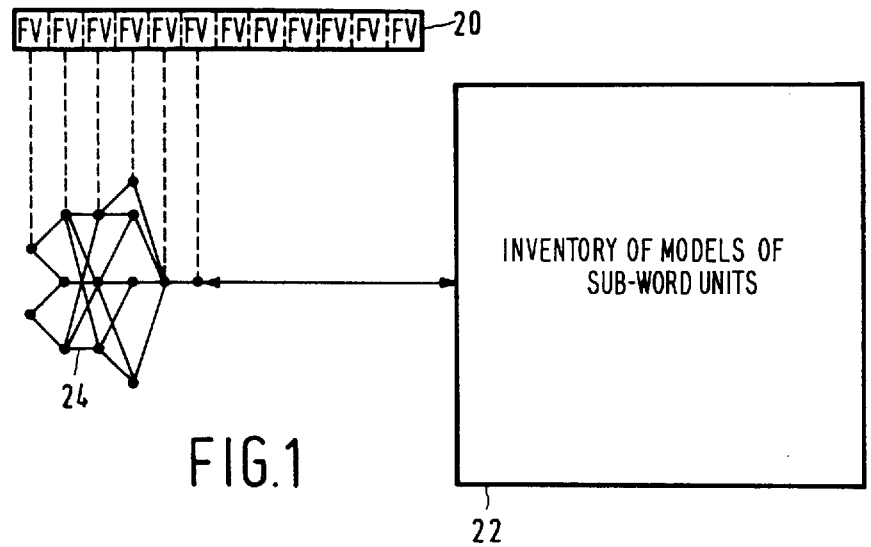
FIG. 1 a system for effecting recognition.

FIG. 1 shows a system for effecting recognition of spoken words. Herein, block 20 represents a spoken word to be recognized, wherein time runs from left to right in the Figure, and the contents of the block are the time-varying feature vectors (FV)s of the speech as sampled. First, the word is broken down into sub-word units shown as smaller stocks. Various such units may be phones, diphones, syllable parts, full syllables, or even single such feature vectors. It is not necessary that a sub-word unit has an acoustic relevance. This breaking down is effected on the basis of various ones of the above feature vectors, and may be done in a conventional manner. The separation is indicated by vertical lines, that need not be equidistant, as shown in the Figure, inasmuch as a mix of longer and shorter sub-word units is feasible. Next, starting from one end of the word in question, the subword units are matched to the items stored in the inventory 22 that has been set up from analyzing a large body of speech. By itself, such analyzing falls outside of the present invention, that takes the inventory as given. Each successive sub-word unit may produce a match with one or more of the inventory items.

Now, each match also brings about a score, which score can depend on the degree of non-correspondence between the two matched items, so that a lower score indicates a better match and vice versa. Furthermore, the score may depend on a language model that indicates the probability for a particular concatenation of words. Again, a low probability gives a high score and vice versa. According to one strategy, in this way a tree is built up from the various possible concatenations of recognized subwords that has branch-wise scoring. A pruning mechanism is provided for terminating and cutting down such branches of the tree that through their high score indicate a very low probability for the associated recognition. When at a certain point in time there are no parallel possibilities anymore for a different particular assignments, the word or word part in question has been recognized, unless the associated score indicates an unrealistical low probability. The latter leads to discarding of a part of the speech as unrecognized and resetting of the scoring. By way of symbolizing, various paths have been indicated, each dot symbolizing the assignment of a subword to an item from the associated row of storage system 22. It should be clear that the representation in the Figure is completely symbolic. Various other scoring and searching strategies are feasible.

Figure 2:
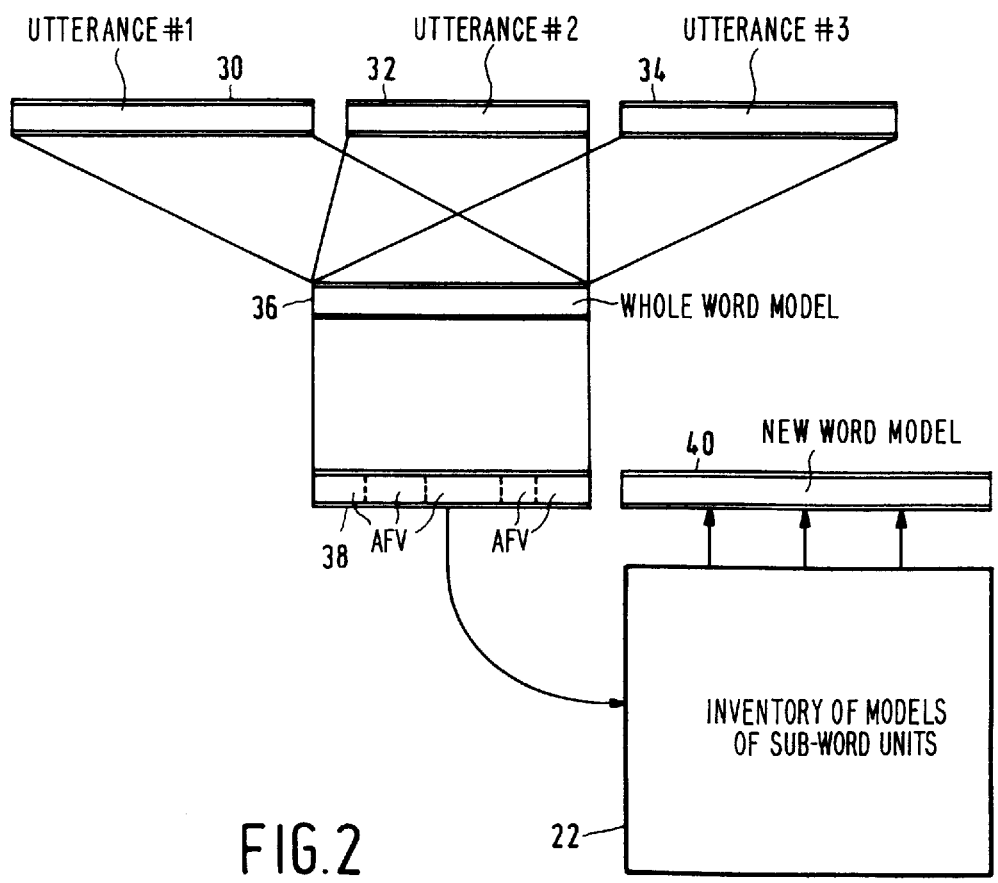
FIG. 2 a system for effecting transcription.

FIG. 2 shows a system for effecting transcription, as based on three utterances (30, 32, 34) of (presumably) the same word by a user person. The user person may be the same one or not. First, the lengths of the utterances are determined, for example by counting the number of uniformly-spaced samples for each utterance, and an average thereof is calculated. Next, a whole-word model (36) that is independent of the sub-word model inventory, with the average length of the utterances is trained using the various utterances. This training may be effected by means of a standard speech recognition training method. Next, this training result is interpreted by means of a sequence of Markov states and associated probability densities of acoustic events of the whole word model. The result (38) is a reference template expressed as a series of averaged feature vectors. This acoustic model then operates as a template, i.e. as some kind of averaged utterance. This latter sequence is then recognized by matching to the various sub-word unit models in inventory 22, and the result (40) is a model for later utterances.

Finally, the transcription for the new word is derived by finding the sequence of sub-word units that best matches the sequence of averaged feature vectors, similarly to the procedure applied in FIG. 1. In contradistinction to FIG. 1 however, often no language model is applied now, because no a priori knowledge on the character of the utterance may be present: it may be a single word, or rather a composite term, such as a given name plus a surname of the person to be called in the telephone system considered supra. In another environment, the usage of a kind of such language model could however be used for possible sequences of subword units.

Also, an acoustic model is used for the recognizing, inasmuch as the acoustic model generally does not necessarily depend on the meaning of the underlying syllables. If the recognition score of the averaged utterances is excessively high, and therefore would represent an excessively low recognition probability, the user person is signalled, such as by an audio message or an indicator light, that the training has been unsuccessful, and that a new training must be undertaken. If the training has been successful, the recognized string of subword units is stored in the inventory, symbolized by block 40, whereupon the user is asked, also by an audio message or an indicator light, to specify the telephone extension number to be subsequently associated with the string 40 upon its later recognition. Such feature then subsequently allows for speech-controlled dialling, in which the transcription is used for recognizing the word to which the system has now been trained.

Figure 3:
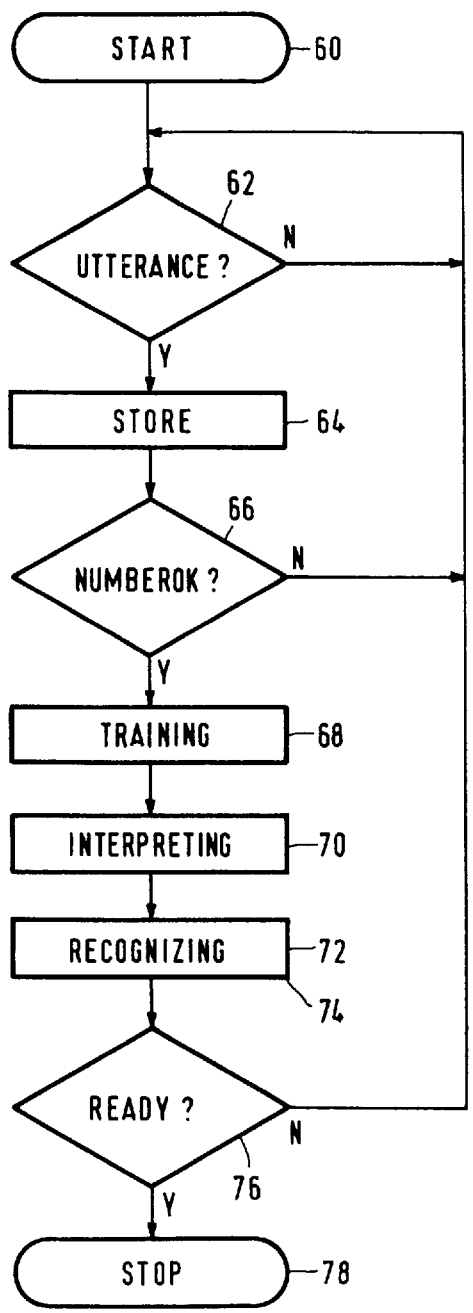
FIG. 3 a flowchart for effecting transcription.

FIG. 3 shows a flowchart for effecting transcription. In block 60 the system is initialized, inter alia by providing the sub-word model inventory and resetting operational parameters. In block 62 the system detects whether an utterance was received. If negative, a waiting loop brings the system back to block 62 again. If positive, in block 64 the utterance is sampled, and stored after representing the samples as feature vectors. In block 66, the system detects whether the number of intendedly conforming utterances had attained an appropriate level, such as three. Another stratagem is to detect an 'execute' command. If negative, the system again reverts to block 62 for expecting a further utterance. In block 68, by means of the various utterances received, a whole-word model of the utterances is trained, without recourse to the inventory, at a length that is the average of the various utterances. Subsequently, in block 70 the whole-word model, represented as a sequence of Markov states and associated probability densities of acoustic events is interpreted as a reference template given as sequence of averaged feature vectors. Subsequently, in block 72, the latter sequence is recognized by matching to the models of the sub-word units in the inventory. This allows to subsequently identify later received utterances as one of the utterances that have now been represented by a string of sub-word models. Next, in block 76 the system detects whether any new utterance should still be received for in its turn to be processed. If not yet ready, the system then reverts to block 62. If ready, or alternatively, by some 'finished' command, the system exits by way of terminating block 78.

Figure 4:
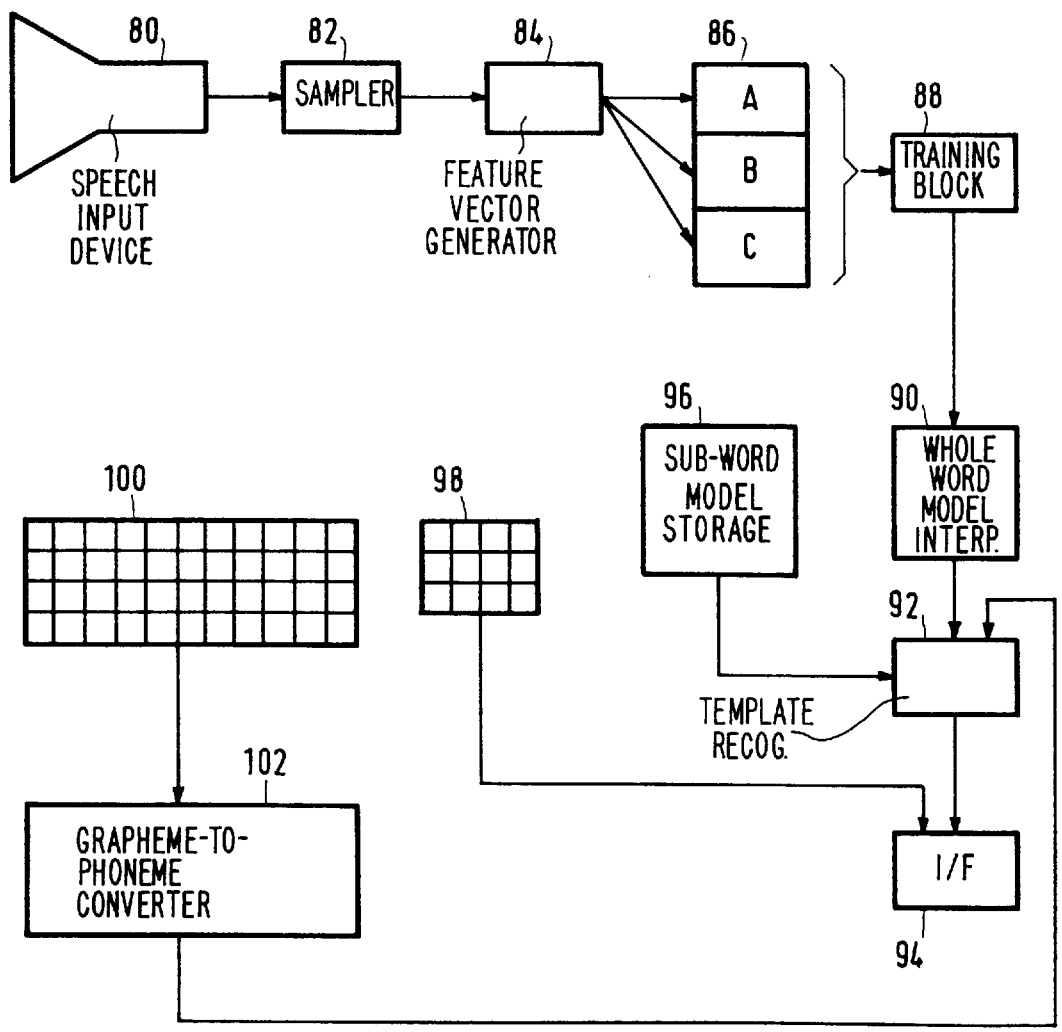
FIG. 4 a device for effecting transcription.

FIG. 4 shows a device for effecting transcription according to the invention. Block 80 is some kind of microphone or other device for speech input. Block 82 effects periodic sampling of the utterance received, and may comprise a speech detector for effecting sampling only when speech is effectively received. Block 84, from the stream of samples develops feature vectors, of speech characteristics. Consequently the device comprises various conventional elements, such as band filters, A/D converters, so that ultimately the feature vectors are a useful vehicle for subsequent processing. In block 86, the feature vector strings of the utterances are stored in the respective sub-blocks A, B, C. Through combined accessing of this storage, training block 88 trains a whole-word model with a length corresponding to the average length of the utterances. This also requires aligning of the various utterance representations. By itself, modelling to a single utterance has been disclosed in the cited art, supra. Next, block 90 interprets the whole-word model received from block 88 which model in particular comprises a sequence of Markov states and associated probability density distributions of acoustic events in the whole-word model. The result from the interpretation is a reference template comprising a sequence of averaged feature vectors. Finally, block 92 accesses the stored inventory of sub-word unit models in storage block 96 and so recognizes the template received from block 90 as matching to a particular sequence of the stored sub-word unit models. Interface (I/F) block 94 interfaces to various other devices according to necessity. For example, it may contain additional storage for storing the series of sub-word models from block 96 that pertain to the utterance for subsequent recognition, so that subsequent reception of a single utterance after translation to feature vectors may be matched to particular sub-word unit models directly.

Several additional but optional user interface devices have been shown in the Figure. Block 98 is a keyboard for telephone usage. Often, this will be a twelve-key device. Keying-in of a telephone extension number, after storing of the sequence of sub-word unit models pertaining to a subsequent utterance, will link this utterance to the keyed-in number and in consequence, will subsequently allow activating of this number under control of speech input of the associated label utterance. Block 100 is an alphabetic keyboard, such as alphanumerical QWERTY. Inputting of a text in block 102 results in grapheme-to-phoneme conversion, which by itself is a conventional feature. The phonemes used have been modelled in correspondence with the modelling of sub-word units in inventory storage 96. The output of converter 102 is presented to recognizer block 92. In this way, the grapheme-to-phoneme conversion may be strengthened by the speech-to-phoneme representation according to the invention, for example, in case of a foreign name that has a different spelling. Also, strengthening in the other direction is possible, in that a particular word could be difficult to recognize in speech.

What is claimed is:

1. A method for constructing a model of a new word for addition to a word model database of a speech recognition system which includes a plurality of pre-existing word models based on an inventory of models of sub-word units, the method comprising the steps of:

receiving a plurality of utterances that each purportedly conform to the new word;

determining an average length of the plurality of utterances;

constructing a whole word model of the new word, using the plurality of utterances but without reference to the inventory of models of sub-word units, wherein the whole word model has a length equal to the average length of the plurality of utterances;

constructing a reference template represented by a sequence of averaged feature values of the plurality of utterances; and, matching the sequence of averaged feature values to the models of sub-word units stored in the inventory of the speech recognition system in order to construct the model of the new word for addition to the word model database of the speech recognition system, whereby the thusly constructed model of the new word is based upon the inventory of models of sub-word units, thereby facilitating the recognition of subsequent utterances of the new word using the inventory of models of sub-word units.

2. The method as set forth in claim 1, wherein the constructing a reference template step is carried out by interpreting a sequence of Markov states and associated probability densities of acoustic events of the whole word model, and then developing the sequence of averaged feature values based upon the resultant interpretation.

3. A speech recognition device, comprising:

a word model database which includes a plurality of pre-existing word models based on an inventory of models of sub-word units:

means for receiving a plurality of utterances that each purportedly conform to a new word which does not correspond to any of the plurality of pre-existing word models included in the word model database;

means for determining an average length of the plurality of utterances;

means for constructing a whole word model of the new word, using the plurality of utterances, but without reference to the inventory of models of sub-word units, wherein the whole word model has a length equal to the average length of the plurality of utterances;

means for constructing a reference template represented by a sequence of averaged feature values of the plurality of utterances; and, means for matching the sequence of averaged feature values to the models of subword units stored in the inventory in order to construct the model of the new word for addition to the word model database, whereby the thusly constructed model of the new word is based upon the inventory of models of sub-word units, thereby facilitating the recognition of subsequent utterances of the new word using the inventory of models of sub-word units.

4. The speech recognition device as set forth in claim 3, wherein the means for constructing a reference template further includes means for interpreting a sequence of Markov states and associated probability densities of acoustic events of the whole word model, and then developing the sequence of averaged feature values based upon the resultant interpretation.

* * * * *